US010291016B2

(12) United States Patent
Ashida et al.

(10) Patent No.: US 10,291,016 B2
(45) Date of Patent: May 14, 2019

(54) ARC HANDLING CONTROL DEVICE, ARC HANDLING CONTROL METHOD AND RECORDING MEDIUM

(71) Applicant: OMRON Corporation, Kyoto (JP)

(72) Inventors: Takeshi Ashida, Nara (JP); Kohei Tomita, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/751,158

(22) PCT Filed: Nov. 29, 2016

(86) PCT No.: PCT/JP2016/085382
§ 371 (c)(1),
(2) Date: Feb. 7, 2018

(87) PCT Pub. No.: WO2017/138227
PCT Pub. Date: Aug. 17, 2017

(65) Prior Publication Data
US 2018/0233901 A1 Aug. 16, 2018

(30) Foreign Application Priority Data

Feb. 10, 2016 (JP) ................................ 2016-023904

(51) Int. Cl.
*H02H 1/00* (2006.01)
*G01R 31/02* (2006.01)
*H02H 7/20* (2006.01)
*H02S 40/30* (2014.01)
*H02S 40/32* (2014.01)
*H02S 50/00* (2014.01)

(52) U.S. Cl.
CPC ............ *H02H 7/20* (2013.01); *G01R 31/025* (2013.01); *H02H 1/0015* (2013.01); *H02S 40/30* (2014.12); *H02S 40/32* (2014.12); *H02S 50/00* (2013.01)

(58) Field of Classification Search
CPC ............. H02H 1/0015; G01R 31/1227; G01R 31/025; G01R 31/40; H02S 50/10;
(Continued)

(56) References Cited

U.S. PATENT DOCUMENTS 6,577,138 B2 * 6/2003 Zuercher ............... B60L 3/0023
324/536
7,366,622 B1 * 4/2008 Nemir ................. G01R 31/1272
361/2
(Continued)

FOREIGN PATENT DOCUMENTS

JP 2013-132157 7/2013
JP 2013132157 A * 7/2013 ............... H02H 3/00
(Continued)

OTHER PUBLICATIONS

"International Search Report (Form PCT/ISA/210) of PCT/JP2016/085382", dated Feb. 28, 2017, with English translation thereof, pp. 1-2.
(Continued)

Primary Examiner — Antony M Paul
(74) Attorney, Agent, or Firm — JCIPRNET

(57) ABSTRACT

The objective of the present invention is to reduce erroneous detection of arcs, and to reduce erroneous responses concomitant with erroneous detection. In a photovoltaic power generation system (100), a main control part (37) controls an arc detecting device (40) in such a way as to suspend arc detection during periods in which arc-like noise is being generated. Examples that can be cited of periods during which arc-like noise is generated include a period from when a PCS (30) starts up to when the supply of power to a power grid (80) begins, and a period during which a current (I) flowing from a power generating device (10) to the PCS (30) is changing suddenly.

15 Claims, 8 Drawing Sheets

(58) Field of Classification Search
CPC ...... H01P 1/00; H02P 3/00; H02P 6/00; H02P 6/14; H02P 27/04; H02P 27/06; H02P 23/00; H02P 27/00; H02P 21/00; H01H 9/30; H01H 33/00; H01H 33/04
USPC ............... 361/2, 12, 14, 23, 42, 56, 57, 134; 318/400.01, 400.02, 700, 599, 800, 801, 318/811, 664; 324/536; 335/201; 337/110; 363/66, 168; 218/18, 21
See application file for complete search history.

(56) References Cited

U.S. PATENT DOCUMENTS

| | | | | |
|---|---|---|---|---|
| 8,924,169 | B1* | 12/2014 | Ledenev | G01R 31/1227 |
| | | | | 361/93.2 |
| 8,988,838 | B2* | 3/2015 | Har-Shai | H02H 1/0015 |
| | | | | 361/42 |
| 9,647,442 | B2* | 5/2017 | Yoscovich | G01R 31/1227 |
| 9,843,288 | B2* | 12/2017 | Chaintreuil | H02S 50/00 |
| 10,158,324 | B2* | 12/2018 | Cheung | G01R 31/40 |
| 2012/0316804 | A1 | 12/2012 | Oberhauser | |
| 2017/0025996 | A1* | 1/2017 | Cheung | G01R 31/40 |

FOREIGN PATENT DOCUMENTS

| | | |
|---|---|---|
| JP | 2014-134445 | 7/2014 |
| JP | 2016-166773 | 9/2016 |

OTHER PUBLICATIONS

"Written Opinion (Form PCT/ISA/237)", dated Feb. 28, 2017, with English translation thereof, pp. 1-6.

\* cited by examiner

ARC HANDLING CONTROL DEVICE, ARC HANDLING CONTROL METHOD AND RECORDING MEDIUM

CROSS-REFERENCE TO RELATED APPLICATION

This application is a 371 application of the international PCT application serial no. PCT/JP2016/085382, filed on Nov. 29, 2016, which claims the priority benefit of Japan application no. 2016-023904, filed on Feb. 10, 2016. The entirety of each of the abovementioned patent applications is hereby incorporated by reference herein and made a part of this specification.

TECHNICAL FIELD

The present invention relates to an arc handling control device and an arc handling control method in a power generation system including a direct current power supply, such as a solar power generation system.

BACKGROUND ART

In recent years, a large number of solar power generation systems have been built as systems that effectively use renewable energy. Accordingly, reports of fire accidents caused by arc failure in the solar power generation systems are also increasing.

In a solar power generation system, it is necessary to rapidly shut off a circuit in order to prevent a fire from occurring due to an arc when the arc occurs. Therefore, a solar power generation system includes an arc detecting device that detects generation of an arc in the system.

In a solar power generation system that includes a solar cell string and is connected to a power conditioner (also referred to as a power conditioning system (PCS)), noise caused by an arc is generated when an arc which is a serial arc or a parallel arc is generated. In this case, a signal in which the noise caused by the arc is superimposed on switching noise of the power conditioner is generated in an output line of the solar cell string (a direct current power supply). Therefore, the arc detecting device acquires the signal of the output line, acquires a signal of the arc from the signal, and detects the generation of the arc.

For this type of arc detecting device, configurations disclosed in Patent Literatures 1 and 2 are known. In the configuration disclosed in Patent Literature 1, in a solar power generation system connected to a power conditioner, a current flowing through the solar power generation system is detected, a power spectrum of the detected current is obtained, and an electric arc is detected from the obtained power spectrum.

Meanwhile, in the configuration disclosed in Patent Literature 2, an arc is detected using a power spectrum of a voltage rather than a power spectrum of a current flowing through an output line of a solar cell string.

CITATION LIST

Patent Literature

Patent Literature 1: US Patent Publication "US2012/0316804A1 (published on Dec. 13, 2012)"
Patent Literature 2: Japanese Unexamined Patent Application Publication "No. 2014-134445A (Published on Jul. 24, 2014)"

SUMMARY OF INVENTION

Technical Problem

For example, noise caused by an arc (arc noise) is white noise as described in FIG. 4 of Patent Literature 1, and a power spectrum thereof has an upwardly convex shape due to an influence of a filter. Incidentally, an output current from a solar cell to a power conditioner is generally a waveform in which an alternating current at a substantially single frequency is superimposed on a direct current. The superimposition of the alternating current despite the fact that the solar cell itself is a direct current power supply is caused by an effect of switching of a DC/DC converter of a power conditioner. However, arc-like noise which is noise of a frequency component similar to the arc (having the upwardly convex shape) is generated due to an operating state of the power conditioner, a change in the amount of solar radiation, or the like. Therefore, there is concern that this arc-like noise may be erroneously detected as the arc noise.

Patent Literatures 1 and 2 describe a technology for avoiding erroneous detection of the arc caused by the switching noise of the power conditioner. However, as confirmed by the inventors of the present application, it was difficult to reliably avoid the above erroneous detection according to the operating state of the power conditioner, the change in the amount of solar radiation, or the like.

Accordingly, an object of an aspect of the present invention is to provide an arc handling control device and an arc handling control method capable of reducing erroneous detection of an arc caused by arc-like noise and erroneous handling such as an arc extinguishment operation according to the erroneous detection.

Solution to Problem

In order to solve the above-described problems, an arc handling control device according to an aspect of the present invention is an arc handling control device including a control part that controls an arc handling device that handles an arc that is generated in a power generation system including a direct current power supply that performs power generation or charging and discharging of power, and a power conversion device that converts power that is supplied from the direct current power supply, wherein the control part controls the arc handling device so that an operation that is executed according to detection of the arc is not performed in a period in which arc-like noise is generated.

Further, an arc detection control method according to an aspect of the present invention is an arc handling control method for controlling an arc handling device that handles an arc that is generated in a power generation system including a power conversion device that converts power from a direct current power supply, the arc handling control method including a step of controlling the arc handling device so that an operation that is executed according to detection of the arc is not performed in a period in which arc-like noise is generated.

Advantageous Effects of Invention

According to the arc handling control device of an aspect of the present invention, it is possible to reduce the erroneous handling of the arc.

Further, according to the arc handling control method according to an aspect of the present invention, it possible to reduce the erroneous handling of the arc.

DESCRIPTION OF EMBODIMENTS

Embodiment 1

Figure 1:
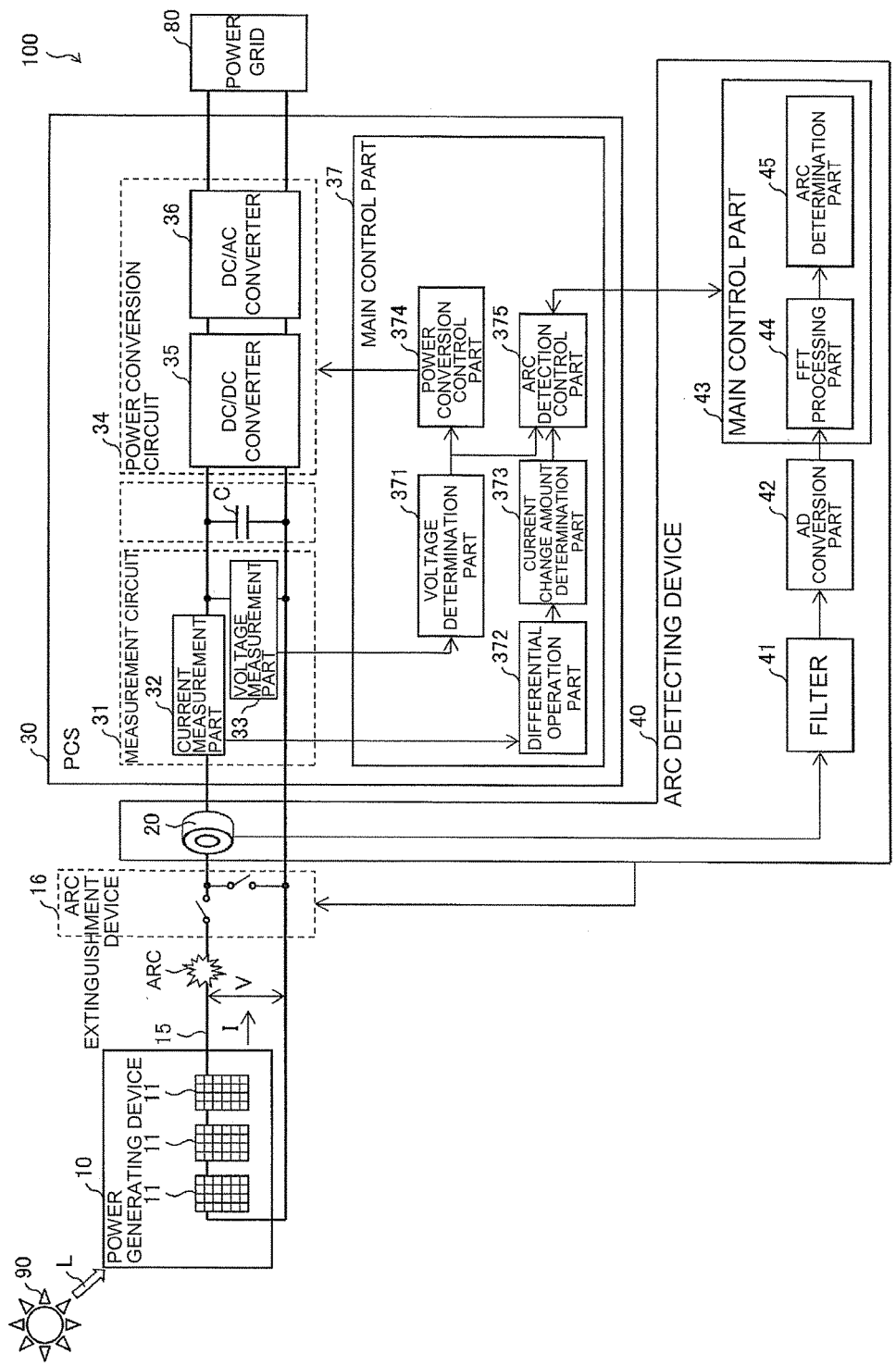
FIG. 1 is a block diagram illustrating a schematic configuration of a solar power generation system according to an embodiment of the present invention.

Hereinafter, Embodiment 1 of the present invention will be described with reference to FIGS. 1 to 6. FIG. 1 is a block diagram illustrating a schematic configuration of a solar power generation system 100 (power generation system) of the embodiment.

(Overview of Solar Power Generation System 100)

As illustrated in FIG. 1, the solar power generation system 100 includes a power generating device 10 (a direct current power supply, a solar power generating device), an arc extinguishment device 16 (an arc handling device), a PCS 30 (power conversion device), and an arc detecting device 40 (an arc handling device). Further, the power generating device 10 and the PCS 30 are connected by an electrical path 15 (power line). Further, the PCS 30 and the arc detecting device 40 can communicate by wire or wirelessly. Further, the arc detecting device 40 includes a current sensor 20 to be described below.

As will be described below, in the solar power generation system 100, the power generating device 10 receives light (sunlight) L from the sun 90 and generates direct current power. The direct current power is converted into alternating current power by the PCS 30 and supplied to a power grid 80. As described above, the solar power generation system 100 is configured to be grid-connectable to the power grid 80. The power grid 80 is a commercial grid for distributing power at, for example, a frequency of 60 Hz (or 50 Hz). Although not illustrated in FIG. 1, the power generating device 10 is also used as a power supply for the PCS 30 and the arc detecting device 40.

In the solar power generation system 100 of the embodiment, the PCS 30 is grid-connected to the power grid 80. However, as will be described below in a modification example, a technical range of the power generation system according to one aspect of the present invention is not limited thereto. The PCS 30 may supply power to other loads that are not grid-connected.

(Power Generating Device 10, Arc Extinguishment Device 16, and Current Sensor 20)

The power generating device 10 is a solar cell string in which a large number of solar cell panels 11 are connected in series. Alternatively, the power generating device 10 is a solar cell array in which a plurality of solar cell strings are connected in parallel.

In FIG. 1, a current flowing through the electrical path 15 is represented by I, and a voltage applied to the electrical path 15 is represented by V. When no abnormality is generated in the electrical path 15, both the current I and the voltage V are values obtained by superimposing switching noise of the PCS 30 on a direct current. However, for example, in a case in which an arc is generated in the electrical path 15, according to an operating state of the PCS 30, the current I includes high frequency components.

The arc extinguishment device 16 is provided on the electrical path 15. The arc extinguishment device 16 is, for example, a breaker, and includes a switch that switches a connection state of the electrical path 15. The arc extinguishment device 16 can extinguish a serial arc generated in the electrical path 15 by turning OFF the switch provided on one of a pair of electrical paths 15. Further, by turning ON the switch provided between the pair of electrical paths 15, a parallel arc generated between the electrical paths 15 can be extinguished. In either case, since the power supply from the power generating device 10 to the PCS 30 is stopped, the amount of generated power in the solar power generation system 100 is reduced.

The arc extinguishment device 16 may be provided in the arc detecting device 40 or may be provided in the PCS 30. Control of an operation (switching) of the arc extinguishment device 16 may be performed by the arc detecting device 40 (specifically, a main control part 43). However, the control of the operation of the arc extinguishment device 16 can also be performed by the PCS 30 (specifically, a main control part 37).

The current sensor 20 is provided in the electrical path 15. In the embodiment, the current sensor 20 is a sensor that detects an alternating current component of the current I and may be, for example, a current transformer (CT). A detection result of the alternating current component of the current I detected by the current sensor 20 is given to a filter 41. As will be described below, the detection result is used for arc detection in the arc detecting device 40.

(PCS 30)

The PCS 30 includes a measurement circuit 31, a power conversion circuit 34, a main control part 37 (an arc handling control device or a control part), and a capacitor C (an input capacitor).

The main control part 37 controls overall operation of the PCS 30. Further, the main control part 37 includes a voltage determination part 371, a differential operation part 372 (a calculation part), a current change amount determination part 373, a power conversion control part 374, and an arc detection control part 375. An operation of each part included in the main control part 37 will be described below.

The measurement circuit 31 includes a current measurement part 32 and a voltage measurement part 33. The current measurement part 32 measures the current I described above. Further, the voltage measurement part 33 measures the voltage V described above. Results of measurement the current I and the voltage V measured by the measurement circuit 31 are given to the main control part 37. As will be described below, the main control part 37 controls the operation of the PCS 30 on the basis of the measurement result.

Further, the power conversion circuit 34 is connected to the measurement circuit 31 via the capacitor C. By providing the capacitor C, a surge voltage can be prevented from being input to the power conversion circuit 34.

The power conversion circuit 34 includes a DC/DC converter 35 and a DC/AC converter 36. The DC/DC converter 35 is a circuit that converts direct current power into direct current power (DC/DC conversion) and is, for example, a step-up chopper.

As an example, the DC/DC converter 35 converts the direct current power generated by the power generating device 10 into direct current power with higher voltage. The direct current power converted by the DC/DC converter 35 is supplied to the DC/AC converter 36.

The DC/AC converter 36 is a circuit that performs a conversion operation (DC/AC conversion) of converting the direct current power supplied from the DC/DC converter 35 to alternating current power and is, for example, an inverter. As an example, the DC/AC converter 36 converts the direct current power into the alternating current power at a frequency of 60 Hz. The alternating current power converted by the DC/AC converter 36 is supplied to the power grid 80.

Thus, by providing the power conversion circuit 34, it is possible to convert the direct current power generated by the power generating device 10 into the alternating current power having a predetermined voltage and frequency that can be grid-connected with the power grid 80. As will be described below, an operation of the power conversion circuit 34 is controlled by the main control part 37.

(Arc Detecting Device 40)

The arc detecting device 40 further includes a filter 41, an AD conversion part 42, and a main control part 43 (arc handling control device, a control part), in addition to the above-described current sensor 20. The filter 41 is a bandpass filter (BPF), and passes only a predetermined frequency range (for example, a predetermined high frequency range) among alternating current components of the current I detected by the current sensor 20.

As an example, the frequency range that the filter 41 passes is 40 kHz to 100 kHz. Accordingly, frequency components containing much noise caused by the power conversion circuit 34 can be excluded from the alternating current component of the current I detected by the current sensor 20.

The AD conversion part 42 converts a current signal that is an analog signal that has passed through the filter 41 into a digital signal and supplies the digital signal to the main control part 43. Accordingly, various calculations for arc detection in the main control part 43 can be performed.

The main control part 43 controls the overall operation of the arc detecting device 40. Further, the main control part 43 includes an FFT processing part 44 and an arc determination part 45.

The FFT processing part 44 performs a fast Fourier transform (FFT) on the current signal as the digital signal supplied from the AD conversion part 42, and generates a power spectrum of the current signal. The FFT processing part 44 gives the power spectrum of the current signal to the arc determination part 45.

The arc determination part 45 analyzes the power spectrum of the current signal acquired from the FFT processing part 44 and determines whether or not noise caused by the arc (arc noise) is included in the power spectrum.

For example, the arc determination part 45 determines that arc noise is included when noise at a predetermined power level or more exists in the high frequency components. As a scheme of arc determination in the arc determination part 45, a known scheme such as schemes disclosed in Patent Literature 1 or Patent Literature 2 may be used.

When the arc determination part 45 determines that arc noise is included in the power spectrum, the arc determination part 45 determines that an arc is generated. However, cases in which the arc determination part 45 determines the generation of an arc not only include cases in which an arc is really generated and but also include cases in which arc-like noise is generated, as will be described below.

Here, arc-like noise is high-frequency noise similar to arc noise that is generated at the time of arc generation, and is noise that is generated in a predetermined state of the solar power generation system 100. Therefore, to be exact, an arc detected by the arc determination part 45 is a suspected arc that is suspected of being an arc.

(Operation State of PCS 30 in which Arc-Like Noise is Easily Generated)

Next, an operation state of the PCS 30 in which arc-like noise is easily generated will be described. As will be described below, the inventors of the present application have found that arc-like noise is easily generated in two operation states of the PCS 30.

(First Operation State)

First, the inventors of the present application found that arc-like noise is easily generated between supply of a voltage to the power conversion control part 374 (in other words, supply of a control voltage to the main control part 37) and start of supply of the converted power to the power grid 80 due to power conversion being performed in the PCS 30. Hereinafter, this operation state is referred to as a first operation state. The control power supply of the main control part 37 is also a control power supply of the PCS 30.

Figure 2A:
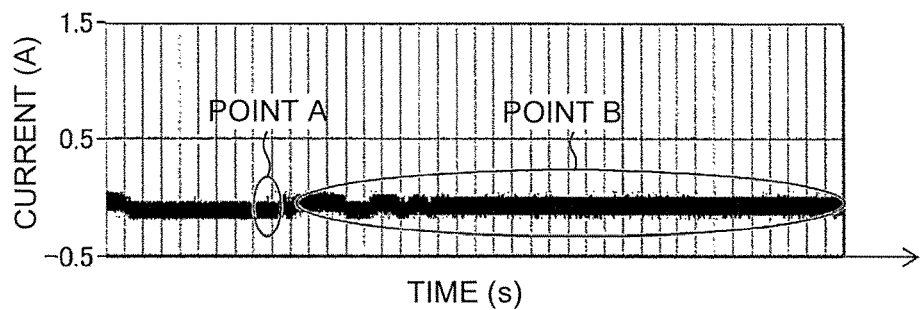
FIG. 2 (*a*) to FIG. 2 (*c*) are diagrams illustrating generation of arc-like noise in a first operation state of the solar power generation system illustrated in FIG. 1, FIG. 2 (*a*) is a diagram illustrating a current waveform, FIG. 2 (*b*) is a diagram illustrating a power spectrum of a current at a point A in FIG. 2 (*a*), and FIG. 2 (*c*) is a diagram illustrating a power spectrum of a current at a point B in FIG. 2 (*a*).
Figure 2B:
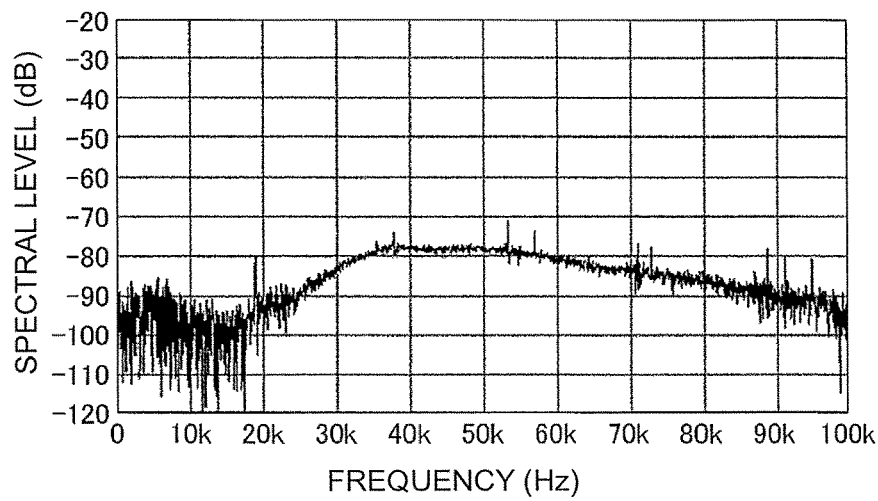
Figure 2C:
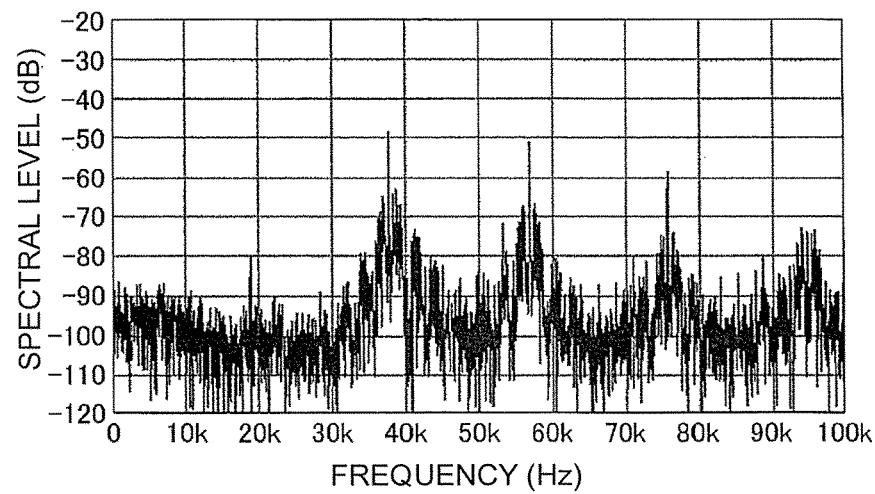

FIG. 2 (a) to FIG. 2 (c) are diagrams illustrating generation of arc-like noise in the first operation state. In the example of FIG. 2 (a) to FIG. 2 (c), it is assumed that no true arc is generated.

Figure 3A:
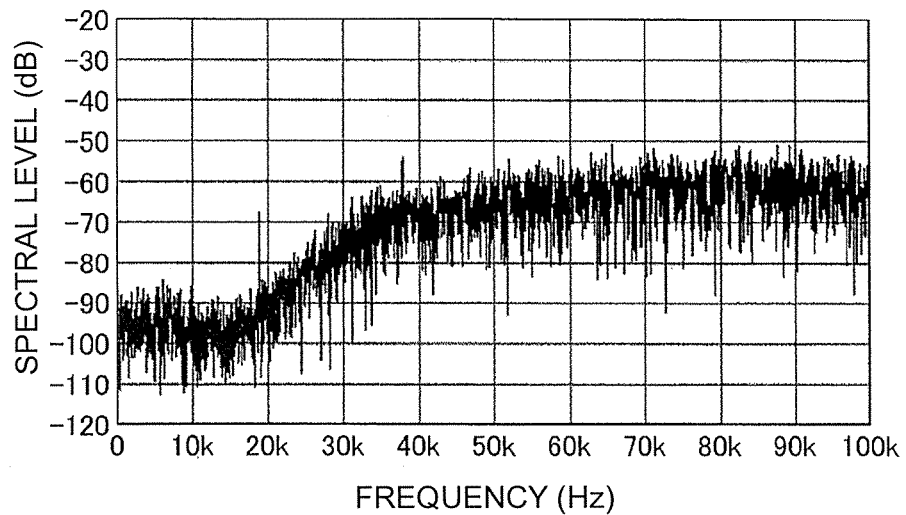
FIG. 3 (*a*) and FIG. 3 (*b*) are comparative diagrams of FIG. 2 (*a*) to FIG. 2 (*c*), FIG. 3 (*a*) is a diagram illustrating a power spectrum of a current during DC/AC conversion when a true arc is generated, and FIG. 3 (*b*) is a diagram illustrating a power spectrum of a current during DC/AC conversion when a true arc is not generated.
Figure 3B:
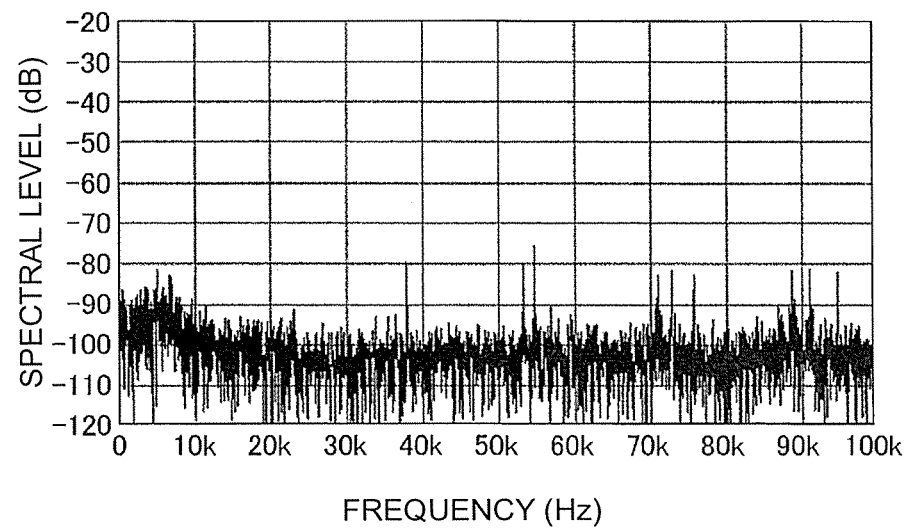

FIG. 3 (a) and FIG. 3 (b) are comparative diagrams (reference diagram) of FIG. 2 (a) to FIG. 2 (c) and are diagrams illustrating generation of the arc noise. In FIG. 3 (a) and FIG. 3 (b), a power spectrum of the current I in a state in which the PCS 30 is performing the DC/AC conversion and a state in which the current I is substantially constant (a constant current state) is shown. First, FIG. 3 (a) and FIG. 3 (b) will be described prior to description of FIG. 2 (a) to FIG. 2 (c).

FIG. 3 (a) is a graph showing the power spectrum of the current I during the DC/AC conversion in a case in which a true arc is generated. As illustrated in FIG. 3 (a), noise at a relatively high power level is continuously included over a wide area in a high frequency region of the power spectrum.

On the other hand, FIG. 3 (b) is a graph showing the power spectrum of the current I during the DC/AC conversion in a case in which a true arc is not generated. As illustrated in of FIG. 3 (b), the noise is continuously included in the high frequency region of the power spectrum, but the power level of the noise is relatively low.

Therefore, when the noise at a relatively high power level is included over a wide range in the high frequency region of the power spectrum, it can be determined that the arc noise is included in the power spectrum.

Next, FIG. 2 (a) is a graph showing a waveform of the current I in a time range from a time before supply of a voltage of the control power supply to a time immediately before the start of the DC/AC conversion. In FIG. 2 (a), points A and B are time ranges from a time immediately after supply of a voltage of the control power supply to the start of power supply to the power grid 80.

FIG. 2 (b) is a graph showing the power spectrum of the current I at point A in FIG. 2 (a). As illustrated in FIG. 2 (b), noise at a relatively high power level is included continuously over a wide range of the high frequency region of the power spectrum even though no arc is generated. That is, the power spectrum of FIG. 2 (b) includes arc-like noise rather than true arc noise.

Further, FIG. 2 (c) is a graph showing the power spectrum of the current I at point B in FIG. 2 (a). As illustrated of FIG. 2 (c), noise at a relatively high power level is included discretely over a wide range of the high frequency region of the power spectrum even though no arc is generated. This state continues in a time range of point B. That is, the power spectrum of FIG. 2 (c) includes arc-like noise rather than true arc noise.

Various factors can be considered as factors causing the arc-like noise between supply of the control voltage and the start of supply of power to the power grid 80, as in points A and B.

For example, when the switch of the arc extinguishment device 16 arranged between the power generating device 10 and the PCS 30 is turned ON in a time zone when the amount of solar radiation is large, an inrush current flows into the capacitor C included in the PCS 30, and arc-like noise is generated.

For example, when the DC/DC converter 35 is started up, an inrush current may be generated at initial switching, and arc-like noise may be generated. For example, the arc-like noise may be generated at the time of an ON/OFF operation confirmation (opening and closing check) of a connection relay (not illustrated) arranged between the power grid 80 and the PCS 30.

For example, when the DC/DC conversion and the DC/AC conversion are performed in a case in which the solar power generation system 100 is not grid-connected and operates autonomously, a switching operation becomes unstable and the arc-like noise may be generated. For example, when the connection relay (not illustrated) is turned ON, an inrush current may be generated and the arc-like noise may be generated.

As described above, it is understood that the arc-like noise is easily generated in the first operation state according to FIG. 2 (a) to FIG. 2 (c), FIG. 3 (a) and FIG. 3 (b) (particularly, FIG. 2 (b) and FIG. 2 (c)).

(Second Operation State)

Second, the inventors of the present application have also found that when the current I and/or the voltage V suddenly changes with time during the power conversion in the PCS 30 (during the DC/AC conversion or the DC/DC conversion), arc-like noise is easily generated. Hereinafter, this operation state is referred to as a second operation state.

Figure 4A:
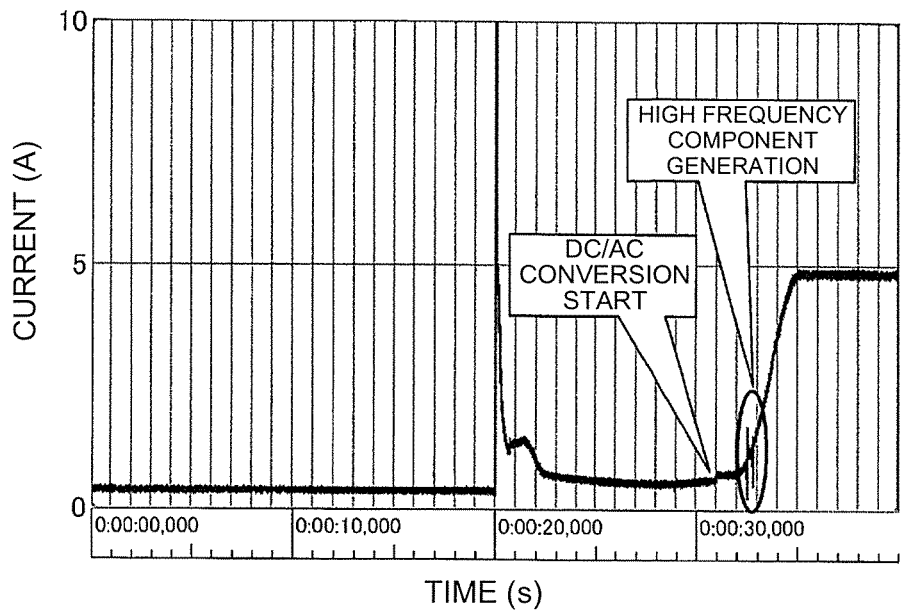
FIG. 4 (*a*) and FIG. 4 (*b*) are diagrams illustrating generation of arc-like noise in a second operation state, FIG. 4 (*a*) is a diagram illustrating a current waveform, and FIG. 4 (*b*) is a diagram illustrating a power spectrum of a current in a portion "high frequency component generation" illustrated in FIG. 4 (*a*).
Figure 4B:
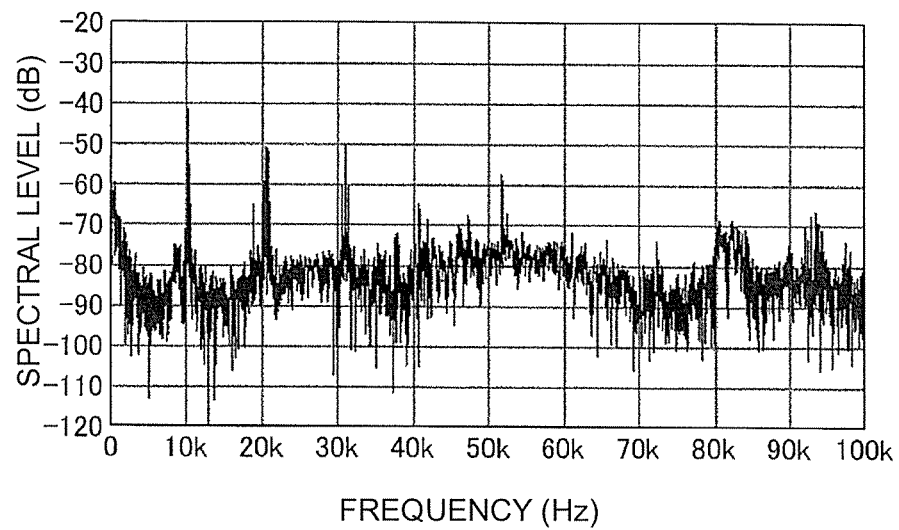

FIG. 4 (a) and FIG. 4 (b) are diagrams illustrating generation of arc-like noise in the second operation state. In the example of FIG. 4 (a) and FIG. 4 (b), it is assumed that no true arc is generated.

FIG. 4 (a) is a graph showing the waveform of the current I in a time range before and after the start of the DC/AC conversion. In FIG. 4 (a), the current I suddenly increases immediately after the start of the DC/AC conversion. Such a sudden temporal change in the current I can also occur, for example, when the amount of the light L incident on the power generating device 10 suddenly changes temporarily.

FIG. 4 (b) is a graph showing the power spectrum of the current I in a portion "high frequency component generation" illustrated in FIG. 4 (a). As illustrated in FIG. 4 (b), noise at a relatively high power level is continuously included over a wide range of the high frequency region of the power spectrum. That is, the power spectrum of FIG. 4 (b) includes arc-like noise rather than true arc noise.

FIG. 4 (a) and FIG. 4 (b) illustrate that the arc-like noise is easily generated when the current I suddenly increases, but the arc-like noise is easily generated similarly when the current I suddenly decreases and when the voltage V suddenly changes (increases or decreases).

As described above, according to FIG. 3 (a), FIG. 3 (b), FIG. 4 (a) and FIG. 4 (b) (particularly, FIG. 4 (b)), it is understood that the arc-like noise is easily generated in the second operation state. On the basis of this point, the inventors of the present application newly proposed a configuration for preventing erroneous detection of the arc in the first operation state and the second operation state, as will be described below.

(Parts of Main Control Part 37)

Next, each part of the main control part 37 will be described prior to description of a process of preventing the arc from being erroneously detected in the solar power generation system 100.

The voltage determination part 371 performs comparison for a magnitude relationship between a value of the voltage V measured by the voltage measurement part 33 and predetermined threshold values (threshold values V0 to V3 in FIG. 5 to be described below). In the solar power generation system 100, the voltage V generally changes according to sunshine conditions.

The differential operation part 372 acquires the value of the current I measured by the current measurement part 32 and calculates a time differential dI/dt of the current I. Here, t is the time. As an example, the differential operation part 372 may perform approximate calculation as $dI/dt \approx \Delta I/\Delta t$, and may use a calculated value as the time differential dI/dt. Here, $\Delta t$ is a minute time, and $\Delta I$ is the amount of a change in the current I at time $\Delta t$. The differential operation part 372 may acquire the alternating current component of the current I measured by the current sensor 20 and calculate dI/dt.

Further, the differential operation part 372 calculates an absolute value of dI/dt (that is, |dI/dt|). Hereinafter, D=|dI/dt| is referred to as a current change amount (electric change amount). It may be understood that the current change amount D is an index indicating a degree of a temporal change in the current I.

The current change amount determination part 373 performs a comparison for a magnitude relationship between the current change amount D and a predetermined threshold value TH (see FIG. 6 to be described below). Further, the power conversion control part 374 controls an operation of the power conversion circuit 34. Further, the arc detection control part 375 controls an operation of the arc detecting device 40.

Figure 5:
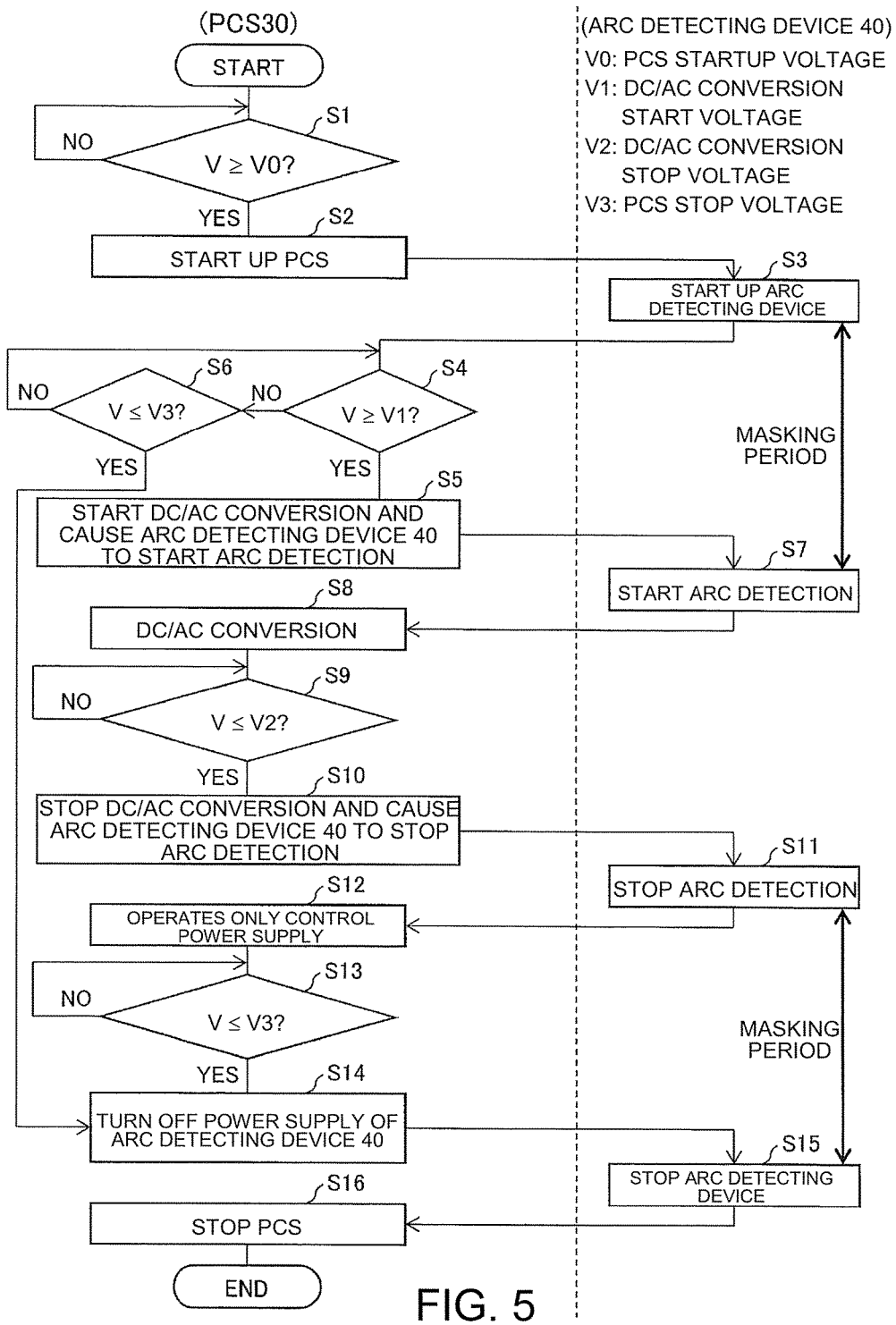
FIG. 5 is a diagram illustrating a flow of a process of preventing erroneous detection of an arc in a first operation state.

As illustrated in FIG. 5 to be described below, in the solar power generation system 100, operation states of the PCS 30 and the arc detecting device 40 are controlled on the basis of determination results of the magnitude relationship described above in the voltage determination part 371 and the current change amount determination part 373.

(Example of Process of Preventing Erroneous Arc Detection in First Operation State)

FIG. 5 is a flowchart showing a flow of a process (S1 to S16) of preventing erroneous detection of arc in the first operation state in the solar power generation system 100.

First, in an initial state (before S1) in FIG. 5, operations of both the PCS 30 and the arc detecting device 40 are stopped. First, the voltage determination part 371 determines whether the voltage V is equal to or greater than the predetermined threshold value V0 (that is, whether V≥V0) (S1). This S1 is performed in a period in which the voltage V increases, for example, early in the morning (a time zone in which the amount of sunlight is increasing or near the time of sunrise).

The threshold value V0 may be set on the basis of a value of a voltage necessary for stably operating a control power supply of the PCS 30. Therefore, it may be understood that this S1 is a process of determining whether the voltage V has increased to a sufficient magnitude to start up the control power supply of the PCS 30.

When V≥V0 (YES in S1), the PCS 30 is started up and the main control part 37 starts the operation (S2). When V<V0 (NO in S1), the process returns to S1.

Further, the arc detection control part 375 gives a command to the arc detecting device 40 and starts up the arc detecting device 40 (S3). As a result of S3, the main control part 43 of the arc detecting device 40 receives the command from the arc detection control part 375 and starts up each of the other parts. At this point in time, the arc detection is not started.

Subsequently, the voltage determination part 371 determines whether the voltage V is equal to or greater than the predetermined threshold value V1 (that is, whether V≥V1) (S4). The threshold value V1 may be set on the basis of the value of the voltage necessary for the DC/AC conversion operation in the power conversion circuit 34. Therefore, it may be understood that this S4 is a process of increasing determining whether the voltage V has increased to a sufficient magnitude to stably perform the DC/AC conversion in the power conversion circuit 34.

When V≥V1 (YES in S4), the power conversion control part 374 starts up the power conversion circuit 34 to prepare for DC/AC conversion. In this case, the arc-like noise as illustrated in FIG. 2 (b) and FIG. 2 (c) is likely to be superimposed on the current I and detected by the current sensor 20. However, since the arc detecting device 40 has not started the arc detection, erroneous detection of the arc does not occur.

When the preparation for DC/AC conversion is completed, the power conversion control part 374 causes the power conversion circuit 34 to start the DC/AC conversion. Further, the arc detection control part 375 gives a command to the arc detecting device 40 and causes the arc detecting device 40 to start the arc detection (S5). As a result of S5, the arc detecting device 40 receives the command from the arc detection control part 375 and starts the arc detection (S7).

When V<V1 (NO in S4), the process proceeds to S6. In this case, the voltage determination part 371 determines whether the voltage V is equal to or smaller than the predetermined threshold value V3 (that is, whether V≤V3) (S6). Since this step S6 is the same as step S13 to be described below, the threshold value V3 will be described in step S13.

When V≤V3 (YES in S6), the process proceeds to S14 to be described below. On the other hand, when V>V3 (NO in S6), the process returns to S4.

As described above, a period from immediately after S3 to immediately before S7 is a period in which the arc detection is not performed although the arc detecting device 40 is started up. Hereinafter, this period is referred to as a masking period. A process of controlling the arc detecting device 40 so that the arc detecting device 40 that has been started up does not perform the arc detection is referred to as masking.

As a result of S5, the power conversion circuit 34 performs the DC/AC conversion (S8). Subsequently, the voltage determination part 371 determines whether the voltage V is equal to or smaller than the predetermined threshold value V2 (that is, whether V≤V2) (S9). This step S9 is performed in a period in which the voltage V decreases, for example, in the evening (a time zone in which the amount of sunlight is decreasing).

The threshold value V2 may be set on the basis of the value of the voltage necessary for the DC/AC conversion operation in the power conversion circuit 34. Therefore, it may be understood that this S9 is a process of determining whether or not the voltage V has decreased to such a magnitude that the DC/AC conversion cannot be continued.

When V≤V2 (YES in S9), the power conversion control part 374 stops the DC/AC conversion in the power conversion circuit 34. Further, the arc detection control part 375 gives a command to the arc detecting device 40 and causes the arc detecting device 40 to stop the arc detection (S10). When V>V2 (NO in S9), the process returns to S9.

As a result of S10, the arc detecting device 40 receives the command from the arc detection control part 375 and stops the arc detection (S11). Further, the voltage determination part 371 operates only the control power supply according to the stop of the DC/AC conversion in the power conversion circuit 34 (S12).

Subsequently, the voltage determination part 371 determines whether the voltage V is equal to or less than the predetermined threshold value V3 (that is, whether V≤V3) (S13). This step S13 is performed in a period in which the voltage V approaches 0, for example, near a sunset time (a time zone in which the amount of the sunlight decreases to substantially 0).

The threshold value V3 may be set on the basis of the value of the voltage necessary for the minimum operation of the control power supply of the PCS 30. Therefore, it may be understood that this step S13 is a process of determining whether the voltage V has decreased to such a level that the operation of the control power supply of the PCS 30 cannot be continued.

When V≤V3 (YES in S13), the arc detection control part 375 turns OFF the power supply of the arc detecting device 40 (S14). When V>V3 (NO in S13), the process returns to S13.

As a result of S14, the arc detecting device 40 stops the operation (S15). Following S15, the voltage determination part 371 turns OFF the main power supply of the PCS 30. Accordingly, the PCS 30 also stops operating (S16). As described above, in the arc detecting device 40, a period from immediately after S11 to immediately before S15 is also a masking period.

Thus, according to S1 to S16 described above, the arc detecting device 40 can start the arc detection at a point in time when the DC/AC conversion in the PCS 30 is started. That is, a start and end timing of the arc detection in the arc detecting device 40 can be synchronized with a start and end timing of the DC/AC conversion in the PCS 30.

Therefore, the arc detection in the arc detecting device 40 is not performed in the first operation state described above (until the control power of the PCS 30 is supplied and the DC/AC conversion is started). Therefore, erroneous detection of the arc-like noise in the first operation state can be prevented.

In S1 to S16 described above, the values of the threshold values V0 to V3 may be appropriately set by a designer of the solar power generation system 100. However, in order to prevent chattering of the PCS 30, it is preferable to set V1>V3.

(Example of Process of Preventing Arc Erroneous Detection in Second Operation State)

Figure 6:
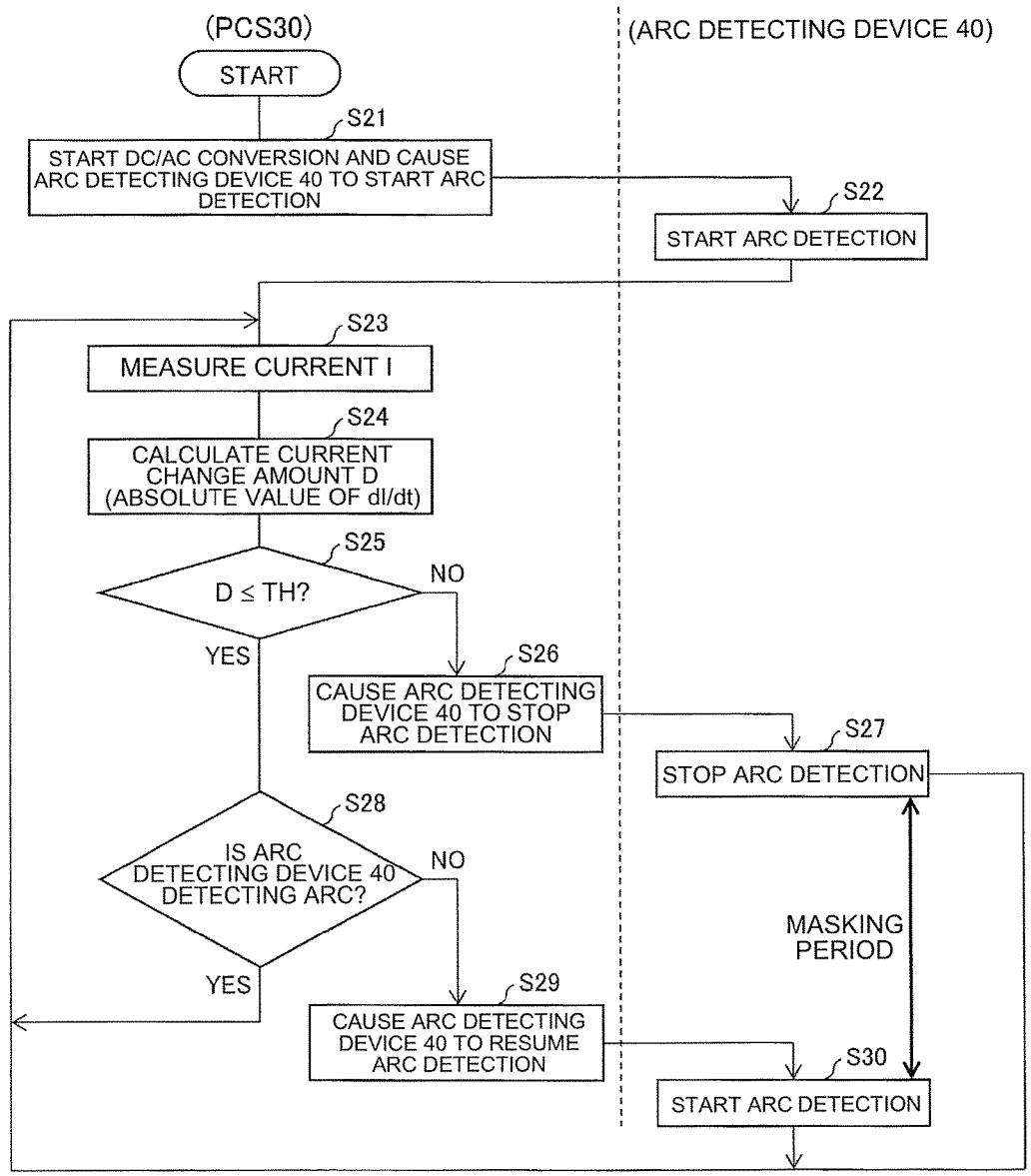
FIG. 6 is a diagram illustrating a flow of a process of preventing erroneous detection of an arc in a second operation state.

FIG. 6 is a flowchart showing a flow of steps S21 to S30 in the solar power generation system 100 to prevent erroneous detection of an arc in the second operation state. Since S21 and S22 in FIG. 6 are the same as S5 and S7 in FIG. 5 described above, description thereof will be omitted. Hereinafter, S23 to S30 will be described.

In the initial state (before S21) in FIG. 6, both the PCS 30 and the arc detecting device 40 are started up.

Following S22, the current measurement part 32 measures the current I (S23). The differential operation part 372 calculates the current change amount D=|dI/dt| (S24). The current change amount determination part 373 determines whether the current change amount D is equal to or smaller than the predetermined threshold value TH (that is, whether D≤TH) (S25).

It may be understood that this S25 is a process of determining whether or not the current change amount D has reached a level at which the arc-like noise which cannot be ignored in the determination of the arc detection can be generated. The threshold value TH may be appropriately set by a designer of the solar power generation system 100 on the basis of an experimental result showing a relationship between the current change amount D and the arc-like noise in the second operation state.

When D>TH (NO in S25), the arc detection control part 375 gives a command to the arc detecting device 40 to cause the arc detecting device 40 to stop the arc detection (S26). As a result of S26, the arc detecting device 40 receives the command from the arc detection control part 375 to stop the arc detection (S27). The process returns to S23 and the above process is repeated.

On the other hand, when D≤TH (YES in S25), the arc detection control part 375 confirms the operation state of the arc detecting device 40 to determine whether the arc detecting device 40 is detecting an arc (S28).

When the arc detecting device 40 is not detecting the arc (NO in S28), the arc detection control part 375 determines that an erroneous detection of the arc due to the arc-like noise is likely to occur, and gives a command to the arc detecting device 40 to cause the arc detecting device 40 to start (resume) the arc detection (S29).

As a result of S29, the arc detecting device 40 receives the command from the arc detection control part 375 and starts the arc detection (S30). The process returns to S23 and the above process is repeated. As described above, in the arc detecting device 40, a period from immediately after S27 to immediately before S30 is a masking period.

When the arc detecting device 40 is detecting the arc (YES in S28), the process returns to S23 and the above-described process is repeated.

As described above, according to S21 to S30 described above, when the current change amount D exceeds the threshold value TH (in the case of D>TH), the arc detecting device 40 can stop the arc detection.

Accordingly, the arc detection by the arc detecting device 40 is not performed in the second operation state (a case in which the current I suddenly changes over time during the DC/AC conversion) described above. Therefore, it is possible to prevent erroneous detection of the arc-like noise in the second operation state.

(Effects of Solar Power Generation System 100)

As described above, in the solar power generation system 100 according to the embodiment, by providing the arc detection control device (the arc detection control part 375), it is possible to mask the arc detection in the arc detecting device 40 in each of the first operation state and the second operation state. Therefore, it is possible to reduce erroneous detection of the arc-like noise in the arc detecting device 40, and thus, to reduce erroneous detection of the arc in the solar power generation system 100. As a result, it is possible to reduce the number of times the solar power generation system 100 stops the supply of the power to the power grid 80 in order to extinguish the erroneously detected arc.

Further, by providing the arc detection control device in the PCS 30, it is possible to easily acquire (recognize) a situation in which the arc-like noise can be generated. Therefore, it is possible to efficiently control the arc detecting device 40 so that the arc detecting device 40 stops the detection of the arc.

The arc detection control device may stop the operation that is executed through detection of the arc in the period in which the arc-like noise is generated. For example, the arc detection control device may stop the operation of the arc extinguishment device 16 in the period in which the arc-like noise is generated. In this case, since the arc is not extinguished, it is possible to reduce the number of times the solar power generation system 100 stops the supply of the power to the power grid 80.

Further, the arc handling control device may instruct the arc extinguishment device 16 to ignore the detection of the arc in the period in which the arc-like noise is generated. In this case, since the arc is not extinguished, it is possible to reduce the number of times the solar power generation system 100 stops the supply of the power to the power grid 80.

In the embodiment, the arc detecting device 40 and the arc extinguishment device 16 are exemplified as the arc handling device that handles the arc, but the arc handling device is not limited thereto. For example, the arc handling device may be an notification part that notifies (warns) the user that the arc has been generated.

The notification part may be a display part that visually performs notification by displaying a warning image. Further, the notification part may be a speaker that audibly performs notification by generating alarm sound.

Thus, the arc detection control device may control the arc handling device that handles the arc so that the operation that is executed by the detection of the arc (the operation includes the arc detection itself) is not performed in a period in which the arc-like noise is generated. Thus, it is possible to reduce erroneous detection of the arc due to the arc-like noise and erroneous handling such as an arc extinguishment operation or notification to the user according to the erroneous detection.

When the PCS 30 and the arc detecting device 40 can communicate with each other, the arc detection control part 375 can be provided in the main control part 43 of the arc detecting device 40. In this case, the arc detection control part 375 can acquire a situation in which the arc-like noise can be generated from the PCS 30, and therefore, can control the arc detecting device 40 so that the arc detecting device 40 stops the detection of the arc.

Embodiment 2

Embodiment 2 of the present invention will be described with reference to FIG. 7 as follows. For convenience of description, members having the same functions as the members described in the above embodiment are denoted with the same reference numerals, and description thereof is omitted.

Figure 7:
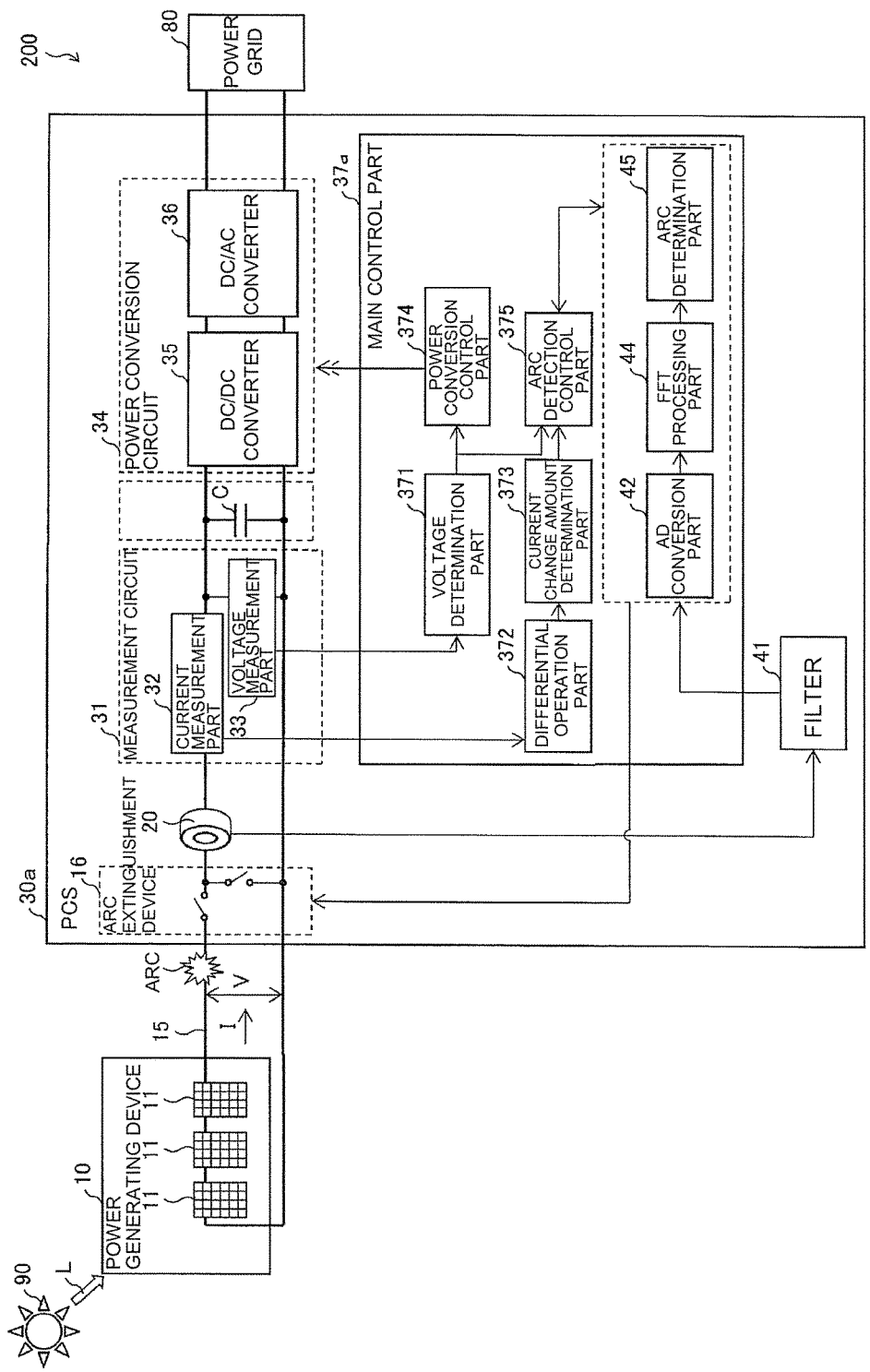
FIG. 7 is a block diagram illustrating a schematic configuration of a solar power generation system according to Embodiment 2 of the present invention.

FIG. 7 is a diagram illustrating a schematic circuit configuration of a solar power generation system 200 (a power generating device) of the embodiment. As illustrated in FIG. 7, the solar power generation system 200 of the embodiment is different from the solar power generation system 100 of Embodiment 1 in that (i) the PCS 30 is replaced with a PCS 30a (a power conversion device), and (ii) the arc detecting device 40 is excluded.

As illustrated in FIG. 7, the PCS 30a according to the embodiment is different from the PCS 30 of Embodiment 1 in that (i) the main control part 37 is replaced with a main control part 37a (an arc detection control device), and (2) an arc extinguishment device 16, a current sensor 20, and a filter 41 are added. The main control part 37a of the embodiment is obtained by adding an AD conversion part 42, an FFT processing part 44, and an arc determination part 45 to the main control part 37 of Embodiment 1.

Thus, in the solar power generation system 200 of the embodiment, the function of the main control part 43 of Embodiment 1 is added to the main control part 37a. That is, in the solar power generation system 200, the main control part 37a that controls an operation of the PCS 30a also has the function of the main control part (the main control part 43 of Embodiment 1) that controls the operation of the arc detecting device.

That is, the solar power generation system 200 of the embodiment is different from the solar power generation system 100 of Embodiment 1 in that the arc detection control device is integrally provided in the PCS.

According to the solar power generation system 200, it is not necessary to provide the arc detection control device (the main control part) in the arc detecting device, and therefore, the configuration of the arc detecting device can be simplified. Therefore, miniaturization and cost reduction of the arc detecting device can be realized. Further, in the embodiment, since the arc detecting device is built in the PCS, it is possible to enhance the function of the PCS.

[Additional Notes]

In Embodiments 1 and 2 described above, the current measurement part 32 may have a function of detecting the alternating current component of the current I. In this case, the current sensor 20 can be omitted.

The masking period is not limited to those illustrated in FIGS. 5 and 6. When the power conversion circuit 34 changes the operation, there is concern that the arc-like noise may be generated, and therefore, another period in which the power conversion circuit 34 changes the operation may be the masking period.

In Embodiments 1 and 2, the solar power generation system has been described by way of example, but the power generation system according to an aspect of the present invention is not limited to the solar power generation system. The power generation system according to an aspect of the present invention may have a function of generating direct current power and converting the direct current power.

For example, the power generating device in the power generation system according to an aspect of the present invention may be a fuel cell device capable of obtaining electrical energy (direct current power) using hydrogen fuel through an electrochemical reaction between the hydrogen fuel and oxygen in the air. Further, the power generating device in the power generation system according to the aspect of the present invention may be a power storage device such as a storage battery or a capacitor that accumulates (charges) and discharges electric energy generated by various power generating devices.

The power generation system according to the aspect of the present invention does not necessarily have to be configured to be grid-connectable to the power grid. For example, the power generation system according to the aspect of the present invention may be configured to supply direct current power or alternating current power output from a power conversion path to a load device capable of receiving the power.

[Example of Realization Using Software]

The control blocks (particularly, the main control parts 37, 37a, and 43) of the solar power generation systems 100 and 200 may be realized by a logic circuit (hardware) formed in an integrated circuit (IC chip) or the like, or may be realized by software using a central processing unit (CPU 300).

Figure 8:
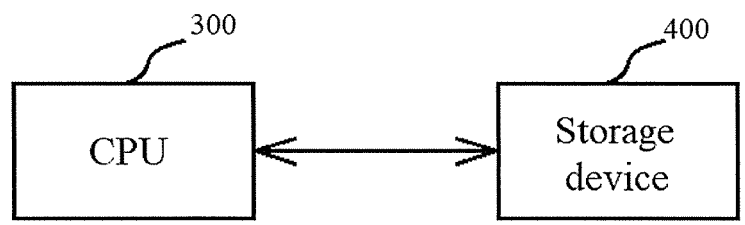
FIG. 8 is a block diagram illustrating a schematic configuration of a CPU and a storage device according to an embodiment of the present invention.

FIG. 8 is a block diagram illustrating a schematic configuration of a CPU and a storage device according to an embodiment of the present invention. In the latter case, the solar power generation systems 100 and 200 include, for example, a CPU 300 that executes instructions of a program that is software that realizes each function, a read only memory (ROM) or a storage device 400 (referred to as a "recording medium") in which the program and various types of data are recorded to be readable by a computer (or the CPU 300), and a random access memory (RAM) for developing the program. The computer (or the CPU 300) reads the program from the recording medium 400 and executes the program, thereby achieving the object of the present invention. As the recording medium 400, a "non-transitory tangible medium", such as a tape, a disk, a card, a semiconductor memory, or a programmable logic circuit can be used. Further, the program may be supplied to the computer via an arbitrary transmission medium (a communication network, broadcast waves, or the like) capable of transferring the program. The aspect of the present invention can also be realized in the form of a data signal embedded in carrier waves in which the program is embodied by electronic transmission.

CONCLUSION

The arc handling control device according to the aspect of the present invention is the arc handling control device including the control part that controls the arc handling device that handles the arc that is generated in the power generation system including the direct current power supply that performs the power generation or the charging and discharging of power, and the power conversion device that converts the power that is supplied from the direct current power supply, wherein the control part controls the arc handling device so that an operation that is executed according to detection of the arc is not performed in the period in which the arc-like noise is generated.

Here, the direct current power supply includes, for example, a solar power generating device, and a power storage device. Further, the power conversion device includes a device that converts direct current power into another direct current power, a device that converts direct current power to alternating current power, and a combination thereof. Further, the arc handling device includes, for example, an arc detecting device that detects an arc, an arc extinguishment device that extinguishes an arc.

When the operation of the power conversion device changes, for example, as in the time of startup, the arc-like noise is generated, and there is concern that the arc handling device regards the arc-like noise as the arc noise and performs erroneous handling, such as erroneous detection of the arc, and an arc extinguishment operation or a notification (warning) to the user according to the erroneous detection.

On the other hand, according to the above configuration, the arc handling control device controls the arc handling device so that the operation that is executed by the detection of the arc is not performed in the period in which the arc-like noise is generated. Accordingly, for example, it is possible to mask the detection of the arc in the arc detecting device in the period in which the arc-like noise is generated, to ignore the detection of the arc in the arc extinguishment device, and to mask an arc extinguishment operation in the arc extinguishment device. Therefore, it is possible to reduce the erroneous handling of the arc.

Further, in the arc handling control device according to the aspect of the present invention, the period in which the arc-like noise is generated may be a period from a time when the power conversion device starts up to a time when the converted power starts to be output to the load.

As described above, the inventors of the present application have found that the arc-like noise is generated in the operation state (the first operation state) in the period from a time when the power conversion device starts up to a time the converted power starts to be output to the load, and the arc handling device is highly likely to perform erroneous handling of the arc.

Therefore, according to the above configuration, in the first operation state, the arc handling control device controls the arc handling device so that the extinguishment of the arc is not performed. Accordingly, for example, in the first operating state, the detection of the arc in the arc detecting device can be masked. Therefore, it is possible to reduce the erroneous handling of the arc.

Further, the arc handling control device according to the aspect of the present invention further includes a calculation part that calculates an electric change amount which is an index indicating a degree of temporal change in current or voltage supplied from the direct current power supply to the power conversion device, wherein the period during which the arc-like noise is generated is a period in which the electric change amount calculated by the calculation part is larger than a predetermined threshold value.

As described above, the inventors of the present application has found that even when the current from the direct current power supply suddenly changes over time (the second operation state) during the conversion operation in the power conversion device, the arc handling device is highly likely to perform erroneous handling of the arc.

Therefore, according to the above configuration, in the second operation state (that is, when the electric change amount is larger than the predetermined threshold value), the arc handling control device controls the arc handling device so that the extinguishment of the arc is not performed. Thus, for example, in the second operation state, detection of the arc in the arc detecting device can be masked. Therefore, it is possible to reduce the erroneous handling of the arc.

The electric change amount is expressed as $D=|dI/dt|$, where I is the current, D is the electric change amount, and t is the time. That is, the electric change amount may be expressed as a magnitude (an absolute value) of the time differentiation of the current.

Further, in the arc handling control device according to the aspect of the present invention, it is preferable for the control part to control the arc handling device such that the operation that is executed according to detection of the arc is not performed when the power conversion in the power conversion device is stopped.

Meanwhile, even when the power conversion is stopped, the arc-like noise may be generated when the power conversion device is in an active state. For example, when check of opening and closing of a connection relay arranged between the power conversion device and the load is performed, the arc-like noise is likely to be generated. Further, when the power conversion device intentionally changes to a self-sustaining operation mode, the power conversion device stops the power conversion and transitions to the active state. In this case, switching of the relay is performed, and the arc-like noise is likely to be generated.

Therefore, according to the above configuration, when the power conversion in the power conversion device is stopped, the arc handling control device controls the arc handling device so that the operation that is executed by the detection of the arc is not performed, and therefore, erroneous handling due to erroneous detection of the arc can be further reduced.

Further, in the arc handling control device according to the aspect of the present invention, the arc handling device may be an arc extinguishment device that extinguishes the arc.

According to the above configuration, it is possible to control the arc extinguishment device so that the arc extinguishment operation is not performed as the operation that is executed through the arc detection. The arc extinguishment operation includes an operation of shutting off the supply of the power from the direct current power supply to the power conversion device. Therefore, when the arc extinguishment operation is performed, the amount of generated power in the power generation system decreases. Therefore, according to the above configuration, it is possible to suppress a decrease in the amount of generated power due to erroneous detection of the arc.

Further, the arc handling control device according to the aspect of the present invention may be provided in the power conversion device.

As described above, the arc-like noise is likely to be generated according to the operation of the power conversion device. Further, the arc-like noise is likely to be generated when the current or the voltage from the direct current power supply to the power conversion device suddenly changes, and the current and the voltage are generally measured by the power conversion device.

Therefore, according to the above configuration, since the arc handling control device can easily recognize the situation in which the arc-like noise can be generated, the arc handling device can be efficiently controlled so that the extinguishment of the arc is not performed.

Further, the arc handling control device according to the aspect of the present invention is provided in the arc handling device, and can communicate with the power conversion device.

According to the above configuration, even when the arc handling control device is provided in the arc handling device, the arc handling control device can communicate with the power conversion device, and therefore, it is possible to recognize the situation in which the arc-like noise can be generated, as a result, it is possible to efficiently control the arc handling device so that the extinguishment of the arc is not performed.

Further, an arc detection control method according to an aspect of the present invention is an arc handling control method for controlling an arc handling device that handles an arc that is generated in a power generation system including a power conversion device that converts power from a direct current power supply, the arc handling control method including a step of controlling the arc handling device so that an operation that is executed according to detection of the arc is not performed in a period in which arc-like noise is generated.

According to the above method, it is possible to achieve the same operation and effect as the arc handling control device having the above configuration.

Further, the arc handling control device according to the aspect of the present invention may be realized by a computer. In this case, by causing the computer to operate as each part (software element) included in the arc handling control device, a control program of the arc handling control device that causes the arc handling control device to be realized by the computer, and a computer-readable recording medium having the control program recorded thereon are also included in the scope of the present invention.

ADDITIONAL NOTES

The present invention is not limited to the above-described embodiments, and various modifications can be performed within the scope defined in the claims, and embodiments that can be obtained by appropriately combining technical means respectively disclosed in different embodiments are also included in the technical scope of the present invention.

The invention claimed is:

1. An arc handling control device comprising a control part that controls an arc handling device that handles an arc that is generated in a power generation system including a direct current power supply that performs power generation or charging and discharging of power, and a power conversion device that converts power that is supplied from the direct current power supply,
   wherein the control part controls the arc handling device so that an operation that is executed according to detection of the arc is not performed in a period in which arc-like noise is generated,
   wherein the control part controls the arc handling device so that the operation that is executed according to detection of the arc is not performed when power conversion in the power conversion device is stopped.

2. The arc handling control device according to claim 1, wherein the period during which the arc-like noise is generated is a period from a time when the power conversion device starts up to a time when the converted power starts to be output to a load.

3. The arc handling control device according to claim 2, further comprising:
   a calculation part that calculates an electric change amount which is an index indicating a degree of temporal change in current or voltage supplied from the direct current power supply to the power conversion device,
   wherein the period during which the arc-like noise is generated is a period in which the electric change amount calculated by the calculation part is larger than a predetermined threshold value.

4. The arc handling control device according to claim 2, wherein the arc handling device is an arc extinguishment device that extinguishes the arc.

5. The arc handling control device according to claim 2, wherein the arc handling control device is provided in the power conversion device.

6. The arc handling control device according to claim 2, wherein the arc handling control device is provided in the arc handling device, and is capable of communicating with the power conversion device.

7. The arc handling control device according to claim 1, further comprising:
   a calculation part that calculates an electric change amount which is an index indicating a degree of temporal change in current or voltage supplied from the direct current power supply to the power conversion device,
   wherein the period during which the arc-like noise is generated is a period in which the electric change amount calculated by the calculation part is larger than a predetermined threshold value.

8. The arc handling control device according to claim 7, wherein the arc handling device is an arc extinguishment device that extinguishes the arc.

9. The arc handling control device according to claim 7, wherein the arc handling control device is provided in the power conversion device.

10. The arc handling control device according to claim 7, wherein the arc handling control device is provided in the arc handling device, and is capable of communicating with the power conversion device.

11. The arc handling control device according to claim 1, wherein the arc handling device is an arc extinguishment device that extinguishes the arc.

12. The arc handling control device according to claim 1, wherein the arc handling control device is provided in the power conversion device.

13. The arc handling control device according to claim 1, wherein the arc handling control device is provided in the arc handling device, and is capable of communicating with the power conversion device.

14. A recording medium recording a control program for causing a computer to function as the arc handling control device according to claim 1.

15. An arc handling control method for controlling an arc handling device that handles an arc that is generated in a power generation system including a power conversion device that converts power from a direct current power supply,
   the arc handling control method comprising a step of controlling the arc handling device so that an operation that is executed according to detection of the arc is not performed in a period in which arc-like noise is generated and a step of controlling the arc handling device so that the operation that is executed according to detection of the arc is not performed when power conversion in the power conversion device is stopped.

* * * * *